United States Patent
Stöck et al.

(10) Patent No.: US 11,444,517 B2
(45) Date of Patent: Sep. 13, 2022

(54) DEVICE FOR PRODUCING STRANDED WIRES, A STRANDED WIRE AND AN ELECTRIC MACHINE HAVING SUCH A STRANDED WIRE

(71) Applicant: JHEECO E-DRIVE AG, St. Gallen (CH)

(72) Inventors: Martin Stöck, Salez (CH); Joel Bauer, Thüringen (AT)

(73) Assignee: JHEECO E-DRIVE AG, St. Gallen (CH)

( * ) Notice: Subject to any disclaimer, the term of this patent is extended or adjusted under 35 U.S.C. 154(b) by 0 days.

(21) Appl. No.: 16/757,135

(22) PCT Filed: Nov. 5, 2018

(86) PCT No.: PCT/EP2018/080177
§ 371 (c)(1),
(2) Date: Apr. 17, 2020

(87) PCT Pub. No.: WO2019/086666
PCT Pub. Date: May 9, 2019

(65) Prior Publication Data
US 2020/0343795 A1    Oct. 29, 2020

(30) Foreign Application Priority Data

Nov. 6, 2017    (DE) .................... 10 2017 125 887.6

(51) Int. Cl.
*H02K 15/00*    (2006.01)
*H02K 3/14*    (2006.01)
(Continued)

(52) U.S. Cl.
CPC ........... *H02K 15/0081* (2013.01); *H02K 3/14* (2013.01); *H02K 15/04* (2013.01); *H02K 15/045* (2013.01);
(Continued)

(58) Field of Classification Search
CPC ........ H02K 3/14; H02K 3/30; H02K 15/0056; H02K 15/0062; H02K 15/0068;
(Continued)

(56) References Cited

U.S. PATENT DOCUMENTS 2,811,063 A    10/1957  Eubanks
2,978,530 A    4/1961   Braeckman
(Continued)

FOREIGN PATENT DOCUMENTS

CH    127110    8/1982
DE    101 64 734 A    1/2004
(Continued)

OTHER PUBLICATIONS

English Translation of International Search Report issued in PCT/EP2018/080177, dated Jan. 22, 2019.
(Continued)

*Primary Examiner* — Peter Dungba Vo
*Assistant Examiner* — Joshua D Anderson
(74) *Attorney, Agent, or Firm* — Calfee Halter & Griswold LLP

(57) ABSTRACT

The invention relates to a method for producing stranded wires, including the steps of applying an insulation layer to lines, separating the insulated lines, individually removing the insulation layer from the separated lines along a partial length of the lines, and bringing the lines together to form a stranded wire, wherein the partial lengths are arranged at the same level at least in sections for the purpose of forming a non-insulated contact region.

15 Claims, 7 Drawing Sheets

(51) Int. Cl.
*H02K 15/04* (2006.01)
*H02K 15/10* (2006.01)

(52) U.S. Cl.
CPC ....... *H02K 15/105* (2013.01); *H02K 15/0056* (2013.01); *H02K 15/0068* (2013.01); *Y10T 29/49009* (2015.01); *Y10T 29/53143* (2015.01)

(58) Field of Classification Search
CPC ............... H02K 15/0081; H02K 15/04; H02K 15/0414; H02K 15/045; H02K 15/068; H02K 15/105; Y10T 29/49009; Y10T 29/49071; Y10T 29/49073; Y10T 29/49201; Y10T 29/514; Y10T 29/53143; Y10T 29/53152; Y10T 29/53243; H01B 13/0023; H01B 13/003; H01B 13/02; H01B 13/0207; H01B 13/0285; H01B 13/0292; H01B 13/06; H01B 13/065; H01B 13/106; H01B 13/16; H01B 13/18; H01B 13/348; H02G 1/12; H02G 1/128; H02G 1/1295
See application file for complete search history.

(56) References Cited

U.S. PATENT DOCUMENTS

| | | | |
|---|---|---|---|
| 3,827,465 A | 8/1974 | Loy et al. | |
| 4,107,838 A * | 8/1978 | Keen | H01R 43/01 29/850 |
| 4,136,440 A * | 1/1979 | Brandewie | H01R 43/01 29/857 |
| 4,630,353 A * | 12/1986 | Okazaki | H01R 43/05 29/564.4 |
| 4,819,329 A * | 4/1989 | Haley | H01B 13/02 29/858 |
| 5,660,742 A | 8/1997 | Warner | |
| 6,649,844 B2 * | 11/2003 | Kusumoto | H02K 3/12 174/128.1 |
| 2002/0148099 A1 | 10/2002 | Eydelie | |
| 2016/0343475 A1 | 11/2016 | Hirao | |
| 2019/0326801 A1 * | 10/2019 | Hein | H02K 3/12 |

FOREIGN PATENT DOCUMENTS

| | | |
|---|---|---|
| DE | 10 2005 004 754 A | 8/2006 |
| DE | 10 2008 010 052 A | 8/2009 |
| DE | 11 2015 001 994 A | 1/2017 |
| EP | 2 650 984 A | 10/2013 |
| JP | H0919115 A | 1/1997 |
| JP | H 11-40310 A | 2/1999 |
| WO | 2015/056077 A | 4/2015 |
| WO | 2015162586 A | 10/2015 |

OTHER PUBLICATIONS

International standard IEC 60317, edition 2013.
International Standard IEC 60317-21, Edition 3.0, Specifications for particular types of winding wires—Part 21: Solderable polyurethane enamelled round copper wire overcoated with polyamide, class 155, pp. 1-18. (Oct. 2013).
Office Action from 201880070925.X dated Dec. 3, 2021.

* cited by examiner

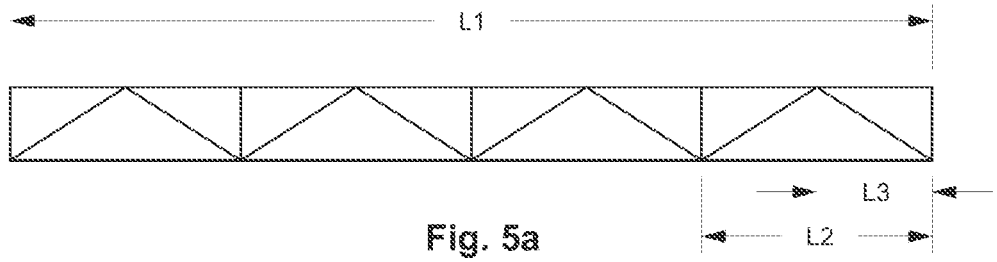
Fig. 5a
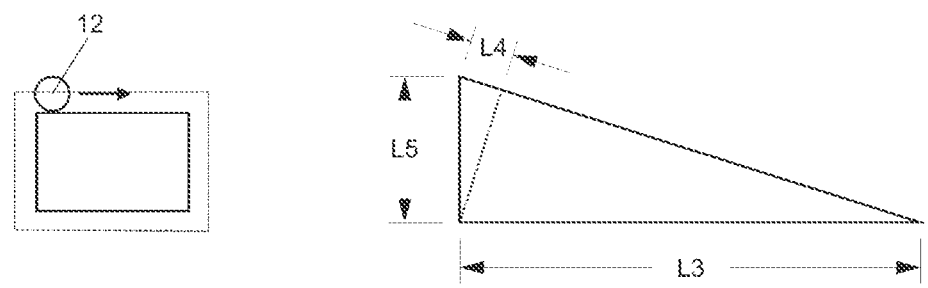
Fig. 5b
Fig. 5c
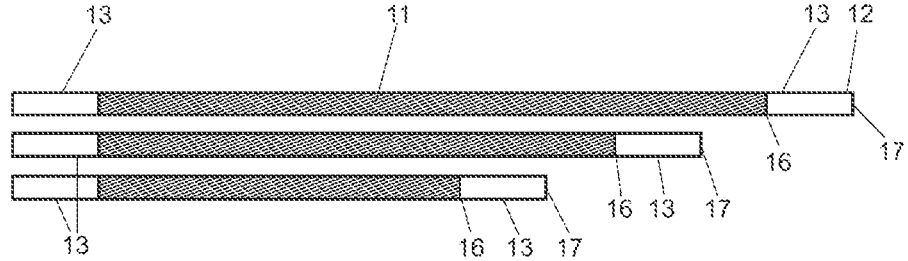
Fig. 6a
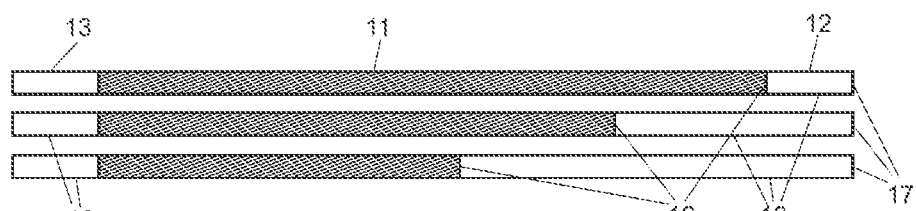
Fig. 6b

DEVICE FOR PRODUCING STRANDED WIRES, A STRANDED WIRE AND AN ELECTRIC MACHINE HAVING SUCH A STRANDED WIRE

CROSS REFERENCE TO RELATED APPLICATIONS

This application is a U.S. National Stage Entry of International Patent Application Serial Number PCT/EP2018/080177, filed Nov. 5, 2018, which claims priority to German Patent Application No. DE 10 2017 125 887.6, filed Nov. 6, 2017, the entire contents of both of which are incorporated herein by reference.

FIELD

The present disclosure generally relates to methods and to an apparatus for producing stranded wires.

BACKGROUND

Assembled windings are known for stator windings of electric motors. This is to be understood to mean that the windings are not wound in one piece, that is to say the winding can take place outside the stator with subsequent insertion, so-called pull-in winding, or directly in the stator, but rather partial conductors or conductor segments are inserted into the individual stator slots and interconnected afterward to form conductor loops by way of approximately two ends of two conductor segments being electrically conductively connected to one another. This can be done directly (for example by direct welding of the conductor segments) or indirectly (by means of the intermediate connection of a connecting element or an interconnecting web). In the simplest case, conductor segments of this kind are copper bars composed of solid material which are electrically conductively contact-connected after being inserted or pushed into a stator slot at both ends. An alternative is presented by so-called hairpin windings in which two conductor segments are connected (and integrally produced) in a U-shaped manner, so that a hairpin of this kind only has to be electrically connected on one stator side.

Finally, shaped stranded wires are a further alternative to segmented conductors in the case of which the conductor segments do not consist of solid material but rather of a twisted wire bundle (stranded wire) and are compression molded (shaped stranded wire), wherein the individual wires of the stranded wire are insulated from one another. The compression is performed primarily in order to obtain a shaped stranded wire which is as tightly compressed as possible and has as much copper as possible for each slot cross section, that is to say has a high degree of filling and therefore a highly effective conductor cross section. In contrast to solid-material bars, the skin effect in wire bundles is considerably smaller. Before compression, the shaped stranded wires are usually twisted since this prevents parasitic effects (eddy current losses).

A shaped stranded wire can consist of a single, that is to say "large", twisted stranded wire or of a large number of partial stranded wires which, for their part, consist of a number of individual wires and are twisted. Shaped stranded wires are known from generator technology, and there are referred to as Roebel bars (Roebel transposition means twisting individual wires or conductors with a rectangular cross section).

Stator windings are also insulated from the stator. This main insulation can be implemented, for example, as slot insulation in the form of insulating paper which is inserted into stator slots. It is also possible to directly encapsulate conductor segments with a main insulation by injection molding.

The use of assembled shaped stranded wire windings not only requires the shaped stranded wires themselves to be connected to form conductor loops, but rather requires the individual wires of each shaped stranded wire to be electrically connected to one another in the head region. The electrical connection also implies a sufficiently strong mechanical connection which has to have a long service life (vibrations and shaking).

In this respect, welding methods such as ultrasonic welding or electrode welding with the use of sleeves are sufficiently well known from the prior art. One example of the prior art is U.S. Pat. No. 5,660,742 which describes a combined method for connecting stranded wires in the head region, which method comprises ultrasonic welding, electrode welding and also sleeve compression.

The production process for shaped stranded wires usually consists of the individual steps of
  a) twisting individual conductors,
  b) compressing or roll forging said conductors to form a rectangular cross section,
  c) cutting the continuous shaped stranded wire or the continuous individual wire to the correct length,
  d) contact-connecting the individual wires in the head region of each shaped stranded wire,
  e) inserting the shaped stranded wire into a stator slot,
  f) connecting a plurality of shaped stranded wires to form conductor loops.

One problem faced with the known connection techniques is the enameled wire insulation of the individual wires in the head region which inhibits electrical and mechanical connection. In the cited prior art, this enamel in the head region is partially burnt off by the action of heat (electrode welding), partially melted and expelled. However, this leaves residues.

One disadvantage of this is, in particular, that enamel residues in the end product
  reduce the mechanical strength of the connection,
  reduce the electrical conductivity,
  reduce the thermal conductivity and
  cause a high degree of scatter of these properties even in shaped stranded wires from the same production line.

Furthermore, the enamel renders processing more difficult when contact-connecting the individual wires since
  the enamel makes the connecting process, in particular welding processes, more difficult on account of interaction between arcs and enamel vapors/smoke
  the enamel cannot ensure a consistent process quality and
  a separate or integrated suction-removal system for vapors in the individual wire contact-connecting machine has to be kept in the immediate vicinity of the contact-making process.

Furthermore, the enamel residues make further processing more difficult because
  the expelled enamel overhangs have to be removed, generally by cutting off an end piece in the case of head-side expulsion
  the expelled enamel overhangs contaminate compression, welding or other tools and as a result both the quality of the subsequent workpieces is adversely affected and also the servicing intervals and intensities for the tools used increase.

Thus a need exists for producing stranded wires, in particular shaped stranded wires, which operates firstly in a reliable and automatable and secondly efficient manner. Further, a need exists for specifying a corresponding apparatus for producing stranded wires, a stranded wire and an electric machine comprising a stranded wire of this kind.

BRIEF DESCRIPTION OF THE FIGURES

FIG. 4b is a schematic plan view of the stator according to FIG. 4a.

FIG. 5a is a schematic view of a shaped stranded wire in which a wire makes four complete "revolutions", that is to say 4 lays. The triangles indicate the lays. The depicted lengths are the active length (part of the shaped stranded wire within the stator slot), the lay length and the half-lay length.

FIG. 5b is a schematic plan view of a wire of a shaped stranded wire which has to cover a rectangular path for one lay, which rectangular path corresponds to the circumference of the shaped stranded wire. Accordingly, half the path has to be covered for half a lay.

FIG. 5c is a schematic view of the difference in length which is produced between the direct path (for example a core wire) and the individual wire which has half a lay. Horizontal: length of the direct path; vertical: diversion for a half-lay; connecting line: resulting length. The perpendicular from the direct path to the resulting length indicates the difference in length.

FIG. 6a is a schematic view of an exemplary embodiment in which individual wires or partial stranded wires, that is to say in general lines, of different length are produced (for the various layers 1, 2, 3 according to FIG. 1) and these are each stripped of insulation by the same length at the ends. In the event of twisting, these lines should ideally terminate flush, so that both the start and also the end of the regions which are stripped of insulation come to lie one above the other for all lines.

FIG. 6b is a schematic view of a further exemplary embodiment in which all of the individual wires or partial stranded wires, that is to say in general lines, are cut to the same length but have insulation-stripped regions of different sizes. In the event of twisting, the starting edges of the region which is stripped of insulation will come to lie flush one above the other, but the ends of the wires will not terminate flush with one another, so that additional cutting is necessary here and waste is produced.

FIG. 1).

DETAILED DESCRIPTION

Figure 1:
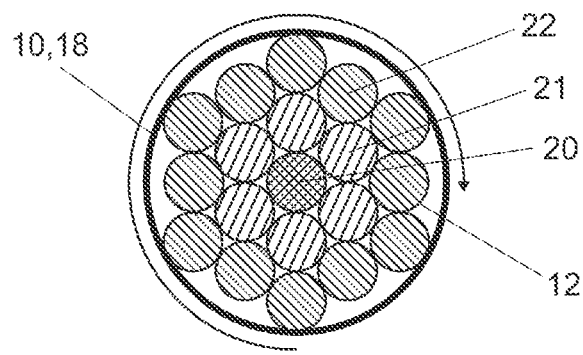
FIG. 1 is a schematic view of a litz wire with three layers 1, 2, 3 composed of individual wires which are twisted with respect to one another.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to methods and to an apparatus for producing stranded wires, to a stranded wire and to an electric machine having a stranded wire of this kind.

In some examples, a method for producing stranded wires comprises the following steps:

a) applying an insulation layer to lines b) separating the insulated lines c) individually removing the insulation layer from the separated lines along a partial length of the lines and d) bringing the lines together for the purpose of forming a stranded wire, wherein the partial lengths are arranged at the same level at least in sections for the purpose of forming a non-insulated contact region.

Here, lines are intended to be understood to mean electrically conductive wires (individual conductors). Applying and removing the insulation layer relates to the treatment of these wires. An insulated individual conductor can also be referred to as an enameled wire or magnet wire. The voltage differences between individual conductors of a stranded wire are small compared to voltage differences between a segment conductor and a stator. A main or slot insulation is not the subject matter of the invention.

The invention has the advantage that low-waste production of stranded wires, in particular shaped stranded wires, is possible, even and specifically in the case of continuous production methods. Low-waste production means, for example, a reduction in inactive/non-functional regions of a stranded wire. The active length of a stranded wire and also the immediate contact-making region are functional. The intermediate piece between an active length and contact-making means performs only secondary functions, in particular creepage and flashover protection, and should therefore be as short as possible.

The insulation used is advantageously a plastic or synthetic resin.

Continuous stranding of lines, in particular of individual wires, which is more economical than batchwise production, can be carried out by the invention without a great deal of difficulty when positioning and selecting suitable insulation-stripping devices with sufficiently high processing speeds and simultaneous selectivity between an insulated region and a region which is stripped of insulation, that is to say a non-insulated region.

However, in addition to continuous production methods in which the advantages of the invention take particular effect, the invention also comprises batchwise methods, that is to say non-continuous methods.

"Application of an insulation layer on lines" can also be understood to mean the provision of a wire which has already been insulated (enameled wire). That is to say, the process step can be removed and carried out independently of the other process steps. If enameled wire is temporarily stored on wire rollers for subsequent use, the concept of the invention should therefore be retained.

Individual removal of the insulation layer from the separated lines along a partial length of the lines is understood to mean individual treatment of each line in the case of which a specific individual line is acted on such that its insulation layer is partially removed, that is to say removed along a partial length. Here, removal does not necessarily mean removal of the insulation layer without residues. Removal can also mean wearing down or reducing the thickness of the insulation layer to a technically relevant extent. It is possible for a plurality of individual treatments to be carried out at the same time, wherein a first line is individually treated or processed and at least one second line is likewise individually treated or processed, that is to say treated or processed substantially independently of the first line. In any case, the individual lines are machined in an individually controlled manner, in contrast to chemical treatment of all the lines for example. Separation of the lines, which renders possible individual machining of the individual lines, is also evident in this context.

It is known from generator technology to remove the insulation from completed conductor segments in the head region. To this end, the end section of a Roebel bar is split open and then mechanically brushed clear by hand. A solution of this kind is not practicable for mass production. This likewise applies to chemical stripping of insulation.

Lines can be individual wires or partial stranded wires (also called litz wires) which themselves are in turn constructed from individual wires. The invention comprises stranded wires in general and shaped stranded wires in particular, which shaped stranded wires are produced by compression (see above). A stranded wire or shaped stranded wire is understood to mean the entire part which is constructed from a plurality of components (individual wires and/or partial stranded wires).

The statements made below in connection with individual wires also apply to partial stranded wires, and vice versa.

Preferred exemplary embodiments are specified in the dependent claims.

In one preferred embodiment, steps a) to d) take place continuously. This has the advantage that the method can be carried out in a particularly economical manner since stranding of the lines, in particular of the individual wires, takes place continuously and the stranded wires, in particular shaped stranded wires, are cut to the appropriate length after stranding.

As an alternative, at least steps c) and d) can take place batchwise. In this case, the lines are cut to length before being brought together, so that the length of the stranded wires or of the shaped stranded wires is already defined before being brought together, in particular stranded.

The individual removal in accordance with step c) preferably comprises laser ablation of the insulation layer, in particular laser evaporation of the insulation layer.

Laser evaporation is particularly advantageous because the method
  a) operates in a contact-free manner and therefore does not damage the fragile wire
  b) can evaporate the insulating enamel virtually without residues
  c) is reliable, and
  d) is readily controllable, precise and responds sufficiently rapidly in order to implement complex cutting patterns, in particular even when wires pass the laser at different speeds.

The process of insulation stripping can likewise be readily controlled owing to time instants and periods of time for laser pulses being stipulated.

Very thin insulation layers can be selected in the case of shaped stranded wires for high-voltage motors, in particular if they are twisted, since the voltage difference between the individual wires is very small (only due to the differences in length on account of the twisting) since all of the individual wires in the head region are electrically connected from the start and the end of the shaped stranded wire and are therefore at the same potential. For this reason, the insulation layer can be selected to be thin.

The use of thin insulation layers has the disadvantage that the risk of surface damage to the individual wires, or generally to the lines, primarily during processing, increases as a result. For this reason, a person skilled in the art avoids an excessively small insulation layer thickness per se. However, the greater the extent of twisting of the stranded wires with respect to one another, the less damaging the induced magnetic fields which occur in the event of a short circuit (or a plurality of short circuits) within the shaped stranded wire. Said disadvantage is also effectively counteracted by the contact-free laser evaporation.

Therefore, it is equally possible to use particularly thin insulation layers, in particular if the number of twists, that is to say the lays, is selected to be high, in particular with more than 3 lays, but preferably with more than 5 lays. The insulation thickness is usually specified relative to the wire thickness and denoted grade 1, grade 2 etc. (cf. international standard IEC 60317, edition 2013 in this respect). The shaped stranded wire according to the invention therefore has an insulation thickness which can be selected to be smaller than a pull-in winding with a comparable wire diameter by one grade stage, but preferably 2 grade stages smaller. Specifically, this means that an insulation of grade 1 can be selected for a stranded or shaped stranded conductor according to the invention even at voltage levels above 600 V, in particular above 700 V.

Therefore, a production process with process speeds which are suitable for mass production can be realized in a cost-effective manner.

Provision can also be made to only partially wear down or reduce the insulation layer. That is to say, for example, to reduce the thickness of the insulation layer. For example, the layer thickness can be reduced by more than 30% or by more than 50% or by more than 80%. In the case of a round wire with a circular cylindrical insulation layer, layer thickness denotes the geometric extent in the radial direction.

However, partially wearing down the insulation layer can also mean that the insulation is worn down only at points in the conductor section in which insulation is to be partially stripped. This is the case, for example, when using laser sublimation and high wire speeds in the case of which the insulation/insulation casing is removed only at certain points and remains intact at other points, so that a leopard-like pattern with virtually entirely insulated islands and islands which are virtually entirely stripped of insulation are created. For example, the insulation covering can be removed by more than 30% or by more than 50% or by more than 80% in the contact-making region/head region of the shaped stranded wire.

The ratio between worn-down insulation layer and non-worn-down insulation layer is given here in particular as an optimization process from the number and/or performance of the insulation-stripping device and also the throughput speed of the conductors.

Less insulation material remains at the head end of the shaped stranded wire owing to the partial wearing away of the insulation layer. Therefore, the electrical and mechanical connection of the head end of a shaped stranded wire can be improved in comparison to the prior art. This is advantageous in order to be able to run, for example, higher process speeds of a stranding installation (throughput speeds of >40 m/s) and/or to be able to reduce the output of the insulation-stripping installation (for example the number of lasers).

In a particularly preferred embodiment, the lines are arranged laterally spaced apart from one another during the individual removal in accordance with step c). This is advantageous when removing the insulation layer since the lines are readily accessible.

Different-length, non-insulated partial lengths of the lines are preferably formed during the individual removal in accordance with step c). This has the advantage that the positions of the non-insulated partial lengths are arranged in relation to one another in a simple manner such that the desired contact region is produced when the lines are brought together.

As an alternative to the different-length partial lengths of the lines, it is possible for equal-length, non-insulated partial lengths of the lines, which partial lengths are arranged in an offset manner, to be formed during the individual removal in accordance with step c). This has the advantage over the embodiment in which different-length partial lengths are used that the method operates with a particularly low level of waste and, respectively, the line regions which are not involved in the functioning of the lines are kept as small as possible. To this end, the equal-length partial lengths are arranged in an offset manner. This has the effect that the partial lengths of the individual lines are arranged at approximately or precisely the same level of the stranded wire, so that a uniform contact region is produced in the stranded wire.

Different-length, non-insulated partial lengths of the lines are preferably formed owing to different transportation speeds of the lines in the event of removal during the individual removal in accordance with step c). This simplifies the method since the removal of the insulation layer can take place in a stationary manner. The variable process parameter is the transportation speed of the lines.

Bringing the lines together in accordance with step d) can comprise stranding the lines. Stranding or twisting the lines is the customary manner of connection for reducing parasitic influences, such as eddy currents.

In a preferred embodiment, bringing the lines together in accordance with step d) comprises compression molding for the purpose of forming a shaped stranded wire. Compression molding and, respectively, a shaped stranded wire are understood to mean a method step and, respectively, an intermediate product of which the external shape will be or is at least partially changed. This embodiment has particular advantages in terms of the production of electric machines, in particular stators, in which the stator slots have a prespecified shape into which the shaped stranded wire is inserted. The cross section of the stator slot can be trapezoidal for example. Other shaped cross sections are possible.

The ends of the non-insulated partial lengths that are at the rear in the transportation direction of the lines are preferably arranged flush when the lines are brought together in accordance with step d). This has the result that the contact region runs substantially normal to the longitudinal direction of the stranded wire, so that non-functional regions are minimized. This is non-trivial provided that the lines, in particular the individual wires and/or partial stranded wires, of a shaped stranded wire have different lengths. This may be the case, for example, when using core wires around which further wires are wound.

In addition or as an alternative to this, the ends of the non-insulated partial lengths that are at the front in the transportation direction of the lines can be arranged flush when the lines are brought together in accordance with step d). If both the front and also the rear ends of the partial lengths are respectively arranged flush, a method which forms virtually no waste is formed. The contact region which is produced when the lines are brought together is arranged substantially normal to the longitudinal direction of the stranded wire at both ends, so that firstly little to absolutely no waste is produced and secondly little to absolutely no dead space is produced.

In a particularly preferred exemplary embodiment of the method, the ends of the non-insulated partial lengths that are at the front in the transportation direction of the lines form the start of a new stranded wire. As a result, waste when cutting the stranded wires to length is completely eliminated in the optimum case.

The lines can comprise a plurality of individual wires and/or partial stranded wires. This makes it clear that the method according to the invention and the embodiments of the method according to the invention which are described here can be applied both to the processing of individual wires and also to the processing of partial stranded wires which, in turn, consist of individual wires. The individual wires which are used for the partial stranded wires can likewise be produced according to the invention.

The invention further relates to an apparatus for producing stranded wires, comprising
a device for applying an insulation layer to lines, a device for bringing the lines together for the purpose of forming a stranded wire and
a device for removing the insulation layer from the lines along a partial length of the lines. Provision is made here for a device for separating the insulated lines to be arranged upstream of the device for removing the insulation layer, and for the device for removing the insulation layer to have means for individually removing the insulation layer from the separated lines along a partial length of the lines. The device for bringing the lines together and the device for removing the insulation layer interact in such a way that the partial lengths of the lines are arranged at the same level at least in sections for the purpose of forming a non-insulated contact region. This apparatus is particularly suitable for carrying out the method according to the invention.

Furthermore, a synchronization device, which comprises a measuring device and a processing unit, can advantageously be provided. The measuring device determines the length of a region which is stripped of insulation. This can take place, for example, by measuring the electrical conductivity or by image evaluation. The processing unit determines correction values based on the measurement values of the measuring device, said processing unit sending said correction values to the insulation-stripping apparatus. As a result, for example, the pulse length and/or the pulse time of a sublimation laser can be set or adjusted. As a result, partial sections which are stripped of insulation, are of a desired length and are at a constant relative position in relation to one another can be achieved in the long term, particularly at high wire throughput speeds. The synchronization device can be positioned along a continuous production line, for example upstream of a stranding step.

The separating device may be, for example, a fixing arrangement of the lines on a conveyor belt, which fixing arrangement keeps the lines laterally at a distance (separated). In general, separation can also be understood to mean fixing of separated lines.

The invention further claims a stranded wire comprising lines which each have an insulation layer and are each non-insulated over a partial length, wherein the non-insulated partial lengths form a contact region at which the lines are electrically conductively connected to one another. The insulation layer is removed along the partial lengths individually for each individual wire before the lines are brought together to form a stranded wire.

The invention also discloses and claims an electric machine comprising magnetic components, which electric machine has a large number of lines in receiving openings of a rotor and/or stator, which lines each have an insulation layer and are each non-insulated over a partial length. The non-insulated partial lengths form a contact region at which the lines are electrically conductively connected to one another, wherein the insulation layer is removed along the partial lengths individually for each individual wire before the lines are brought together to form a stranded wire.

The stranded wire can additionally have a main insulation (slot insulation) composed of electrically insulating material. The main insulation surrounds the stranded wire body over its active length. Said main insulation insulates the stranded wire body from a rotor laminated core or a stator laminated core.

The product which is produced using the method according to the invention, that is to say the stranded wire or the shaped stranded wire and also an electric machine having a stranded wire of this kind, are illustrated in FIGS. 1 to 6. Exemplary embodiments according to the invention of the production method and also the apparatus for producing the stranded wire are shown in FIGS. 7 to 12. The stranded wire and, respectively, the electric machine having the stranded wire are disclosed and claimed as such.

The stranded wire 10 according to FIG. 1 may be a complete stranded wire which is constructed from a plurality of lines, that is to say from a plurality of individual wires 12, which are each insulated. FIG. 1 can also serve as an example of a partial stranded wire 18 which is a constituent part of a larger, superordinate complete stranded wire 10. The partial stranded wire 18 is likewise constructed from individual wires 12. The direction of twist of the individual wires 12 is indicated, by way of example, by the arrow running in the clockwise direction. The stranded wire 10 or the partial stranded wire 18 is constructed from a plurality of layers 20, 21, 22 of individual wires 12 which are provided with different hatching for reasons of illustration. The innermost layer 20, also called layer 1, is formed by a so-called core wire. The layer 21 which is second here is arranged around the core wire and is formed from 6 individual wires 12 in the example according to FIG. 1. The third layer 22 is arranged around the second layer 21 and is likewise formed by individual wires 12, specifically by 12 individual wires 12. A different number of layers is possible, as is a different number of individual wires 12 per layer.

Figure 2:
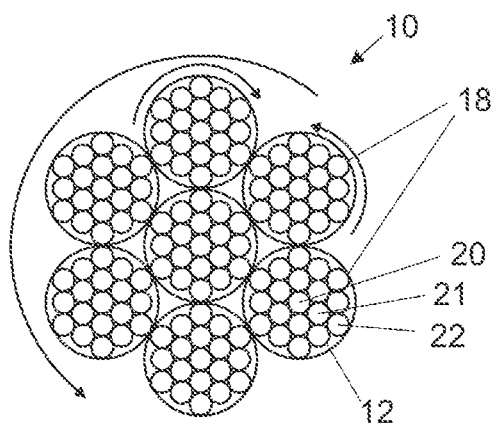
FIG. 2 is a schematic view of a stranded wire or a litz wire which is constructed from partial stranded wires. The litz wires or partial stranded wires can have different directions of twist, as indicated here. The litz wires or partial stranded wires can in turn be twisted with one another.

A stranded wire 10 comprising a plurality of partial stranded wires 18 is shown in FIG. 2. The partial stranded wires 18 can be twisted in opposite directions. The entire stranded wire 10 is in turn twisted in one direction, so that multiple twisting of the individual wires 12 and, respectively, of the partial stranded wires 18 is produced overall.

Figure 3:
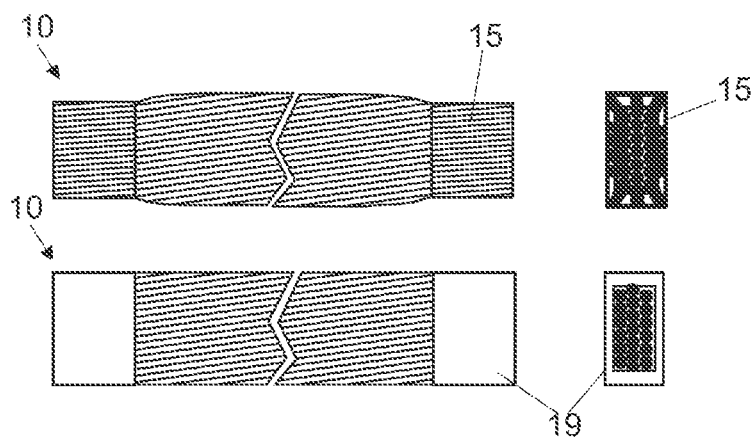
FIG. 3 are schematic front and plan views of a shaped stranded wire with electrically and mechanically contact-connected head regions with a sleeve (lower illustration) and without a sleeve (upper illustration).

FIG. 3 shows the entire stranded wire 10 with the head-side contact regions 15 at the two ends of the stranded wire 10. In the contact region 15, the individual wires 12 and/or the partial stranded wires 18 are electrically and mechanically connected to one another by suitable means and methods. As is clear from the front views according to FIG. 3, the contact regions 15 are compressed to form a rectangular cross section. Other cross-sectional shapes are possible. In the example according to FIG. 3, the stranded wire 10 is compressed at both longitudinal ends and, respectively, has contact regions 15 there. It is also possible to compress the stranded wire 10 only at one of the two longitudinal ends. The upper illustration shows the stranded wire 10 without a sleeve. The lower illustration according to FIG. 3 shows the stranded wire 10 with a sleeve which is pushed over the contact region 15.

Figure 4A:
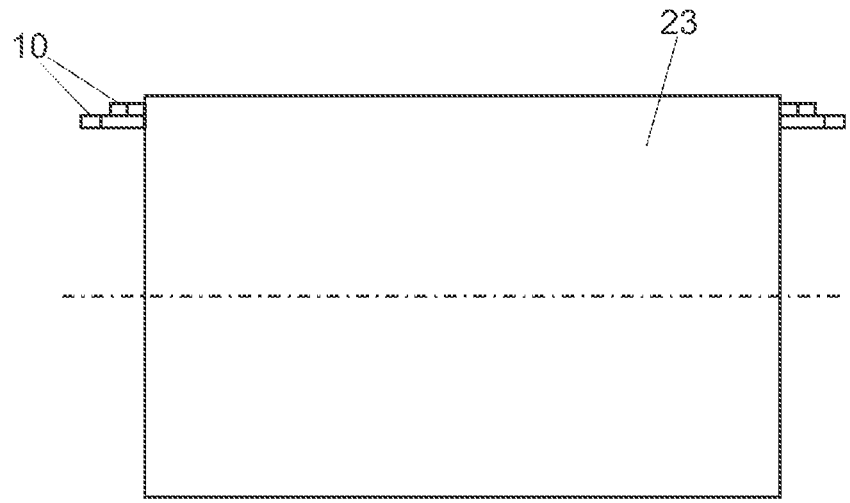
FIG. 4a is a schematic front view of a stator of an electric motor with shaped stranded wires which are inserted by way of example. The shaped stranded wires are not rectangular here, but rather trapezoidal. There are two shaped stranded wires in each slot. In order to simplify the interconnection to form windings, in particular for divided windings, the shaped stranded wires can be of different lengths.
Figure 4B:
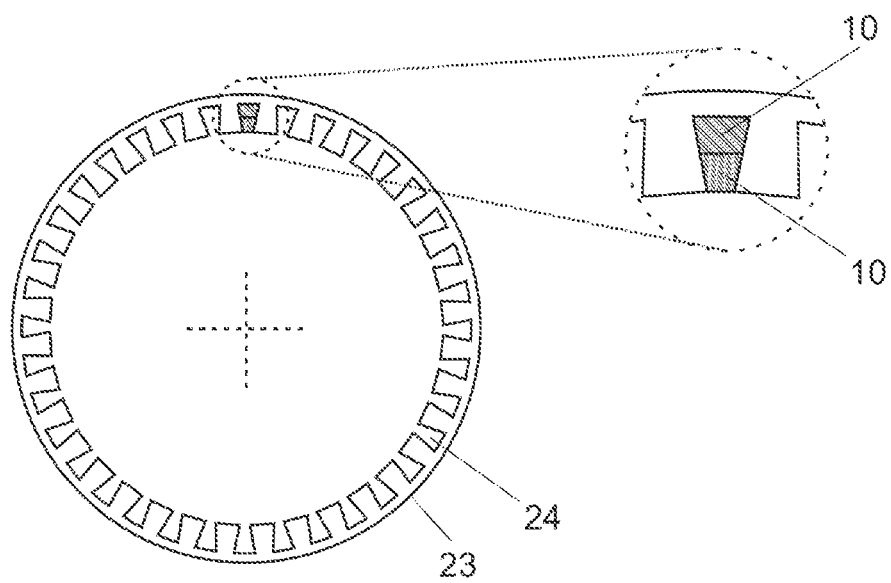

FIGS. 4a and 4b show a component of an electric machine which is equipped with a plurality of stranded wires 10 according to FIG. 3. The component may be, for example, the stator 23 of an electric machine. Other components in which stranded wires 10 of this kind are used are possible. The stranded wires 10 have different lengths. It can be clearly seen in FIG. 4b, in particular in the illustration of a detail of the stator slots 24, that the shaped stranded wires have the same cross section as a stator slot 24. In the example according to FIG. 4b, the cross section is trapezoidal. Other cross-sectional shapes are possible. In the example according to FIG. 4b, two shaped stranded wires 10 are arranged in the same stator slot 24.

With reference to electric machines, "active length" means that line section of a winding that is located within magnetically active parts. In the case of a stator, the active length of a segment conductor, such as of a shaped stranded wire for example, corresponds to that section of the segment conductor that is located within a stator slot. Non-active length components are accordingly located outside the stator slot. FIGS. 5a-c and 6a-b illustrate the problem which arises when individual wires 10 or partial stranded wires 18 are stripped of insulation before being twisted.

FIG. 5a schematically illustrates the windings of an individual wire 12 which winds along an outer circumference of a conductor section with a length L1. One complete turn of the wire is called a lay, and half a turn of the wire is called half a lay or a half-lay. The lengths L2 and L3 indicate the lay or half-lay length, wherein these lengths do not refer to the actual length of the individual wire 12 but rather to the "effective" length parallel to the conductor profile.

FIG. 5b shows an approximate plan view of the additional diversion which an individual wire 12 has to cover over the course of a lay length L3 as a dotted line. The solid-line rectangle illustrates the conductor core around which the individual wire 12 shown is wound.

FIG. 5c shows the difference in length L4 (FIG. 5c) between the direct path (for example of a core wire), that is to say the half-lay length L3, and the individual wire which has half a lay. The half-lay length L3 is depicted horizontally. Half the circumference L5 of the conductor core is depicted vertically. The connecting line is (owing to the wire diameter which is not taken into consideration only in a first approximation) the resulting length of the individual wire for covering a half-lay length. The perpendicular from the direct path to the resulting length illustrates the difference in length.

The different layers 20, 21, 22 (cf. FIG. 1) have different lengths.

FIGS. 6a and b show the two options for producing a twisted litz wire, the ends of which terminate flush.

According to FIG. 6a, the individual wires 12 or the partial stranded wires 18 for the various layers 20, 21, 22 (see FIG. 1) are produced with different lengths. The individual wires 12 or the partial stranded wires 18 are stripped of insulation along partial lengths 13 of equal length. The partial lengths 13 of the individual wires 12 of different length are therefore of equal length and offset in relation to one another on account of the different individual wire lengths. The length of the individual wires 12 or partial stranded wires 18 according to FIG. 6a is dimensioned such that the non-insulated partial lengths 13 are arranged at the same level in the twisted state and therefore form the contact region 15 of the stranded wire. Specifically, the partial lengths 13 are arranged such that those ends 16 that are at the rear in the transportation direction of the partial stranded wires 18 or individual wires 12 during production and those ends 17 that are at the front in the transportation direction are arranged flush one above the other in each case. The transportation direction runs from left to right in FIGS. 6a and 6b. In other words, the front ends 17 form a termination edge of the stranded wire or of the partial stranded wire 18 or of the individual wires 12. Partial lengths 13 which are not insulated and which terminate flush at both ends of the partial lengths 13 are likewise arranged at the other end of the individual wires 12 or partial stranded wires 18.

The insulation layer 11 is applied between the partial lengths 13 on both sides of an individual wire 12 or of the partial stranded wire 18.

According to FIG. 6b, the individual wires 12 or partial stranded wires 18 are of equal length. The partial lengths 13 at one end of the individual wires 12 or partial stranded wires 18 are of different length. The length of the partial length 13 of the innermost individual wire 12 for the first layer 20 is the longest. The length of the partial lengths 13 decreases radially to the outside (with respect to the stranded wire 10). The outermost partial length 13 or the partial length 13 of the outermost individual wire 12 the shortest partial length 13. In the event of twisting, the starting edges 16 of the partial lengths 13 which are stripped of insulation will come to lie flush one above the other. The end edges 17 of the wires 12 will not terminate flush with one another, so that additional cutting is necessary here and waste is produced.

On the other side of the individual wires 12 or 18, the partial lengths 13, which are not insulated, are of the same length.

Figure 7:
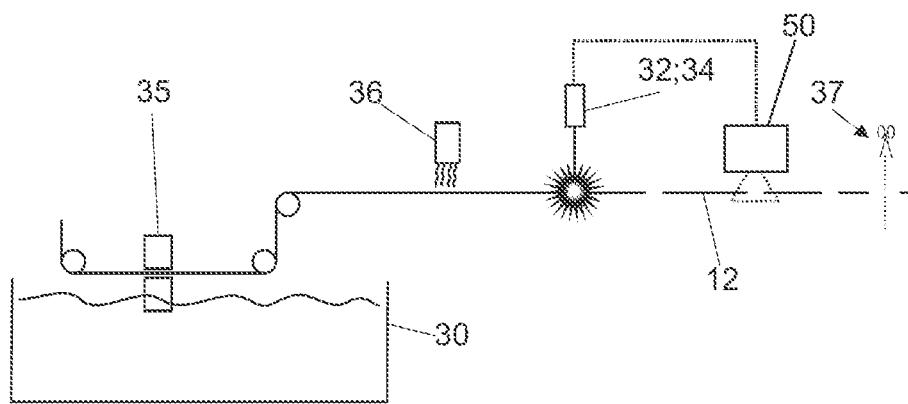
FIG. 7 is a schematic view of an individual wire production line in which the (future) enameled wire runs through an insulation bath, the applied enamel is dried by a drying device, then partially stripped of insulation and then trimmed to length. Different lengths for the individual wires which are to be cut to length are illustrated by way of example here (layers 1, 2, 3, cf.

FIG. 7 shows an exemplary embodiment of an apparatus for producing stranded wires, specifically an individual wire production line. In this case, a plurality of individual wires are usually produced at the same time. These are separated for the purpose of treating the individual wires. This is understood to mean a production step in which the individual wires 12 are spaced apart from one another such that the individual wires 12 are treated substantially individually.

The apparatus has a device 30 for applying an insulation layer 11 to the individual wire 12. Specifically, said device is an insulation bath through which the individual wire 12 is passed in order to apply the insulation layer 11 which consists of enamel. Suitable means 35 which uniformly coat the individual wire 12 in a manner which is known per se are provided for this purpose. The individual wire 12 is then passed through a drying device 36. The dried individual wire 12 is then partially stripped of insulation in a device 32 for removing the insulation layer 11. To this end, corresponding means 34 for individually removing the insulation layer 11 along a partial length 13 of the individual wires 12 are provided. The means 34 for individually removing the insulation layer 11 can comprise a laser device. The individual wire 12 is then trimmed by a device 37 to the length desired here.

Said figure also illustrates a synchronization device 50 which determines the position and length of the individual partial lengths 13, which are stripped of insulation, of the individual wires 12, here illustrated by an imaging process. Depending on the position and length of the partial sections which are stripped of insulation relative to one another, the synchronization device 50 sends control commands to the device 32 in order to adjust the activity of the device 32 as required.

Figure 8A:
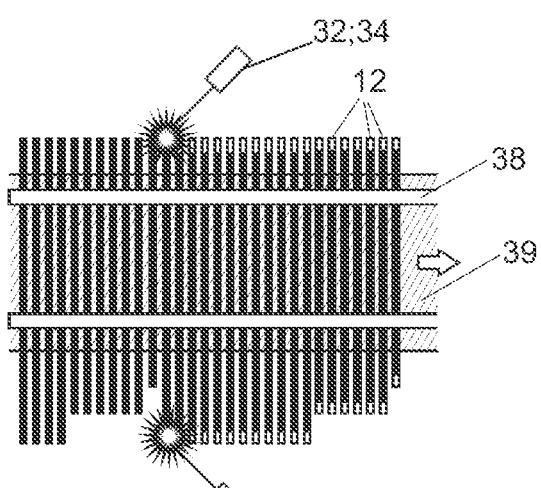
FIG. 8a is a schematic view of an exemplary embodiment of an insulation-stripping apparatus for batchwise production in a variant with litz wires which are trimmed to the correct end length (=FIG. 6a).
Figure 8B:
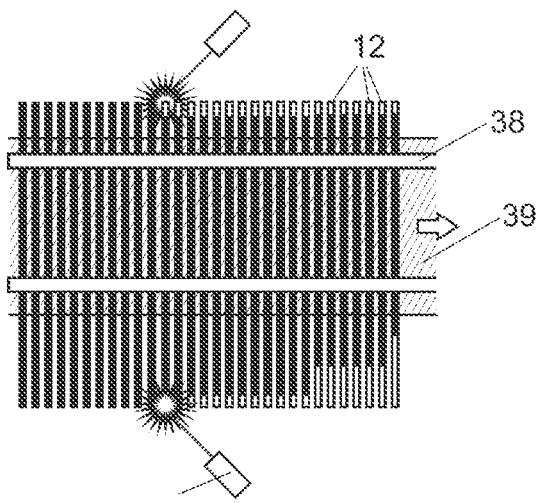
FIG. 8b is a schematic view of a further insulation-stripping apparatus for batchwise production in a variant with insulation-stripped regions of different length (=FIG. 6b).

The apparatus according to FIG. 7 is a batchwise production apparatus which is illustrated in two variants in FIGS. 8a and 8b. FIGS. 8a and 8b show a plurality of individual wires 12 which are arranged separately and are fastened on a conveyor belt 39 by fixing means 38. The conveyor belt 39 moves the separated individual wires 12 in the device (from left to right in the figures). The two laser devices (means 34) are arranged such that they can apply a laser beam to the axial ends of the individual wires 12 in order to strip insulation. In the variant according to FIG. 8a, the individual wires 12 are of different length, as described in more detail in connection with FIG. 6a. The variant according to FIG. 8b relates to an embodiment of the production method in which the individual wires 12 are of equal length. The partial lengths 13 are of different length.

Figure 9A:
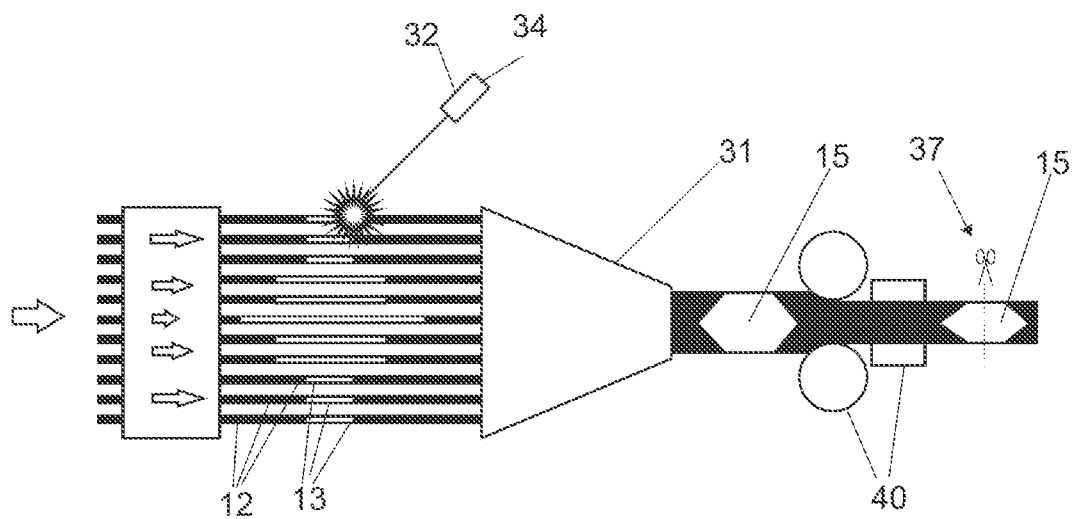
FIG. 9a is a schematic view an exemplary embodiment of a production variant with continuous production with insulation-stripped regions of different length (indicated for a three-layer stranded wire here) which are twisted, roll forged and then trimmed to length.

FIG. 9a shows a variant with insulation-stripped regions of different length (here indicated for a three-layer stranded wire) which are twisted and then trimmed to length. The apparatus can comprise forging rolls 40 in order to shape and/or additionally to compress the twisted stranded wire into a desired outer contour. All of the wires run at the same speed at the output of the twisting device or in general the bringing-together device 31, so that a corresponding V pattern (given a corresponding longitudinal section through the stranded wire) is (approximately) produced in the insulation-stripped region of the twisted stranded wire. The V region is a waste product in the sense that it cannot be used as a contact-making region (owing to the residual enamel) or as an insulation section between the contact-making region and the active length (owing to the partially missing insulation). This increases the "gross length" of the shaped stranded wire. Equally, the requirements in respect of precision of the insulation-stripped sections are more modest than in the case of the following production processes since the regions of overlap can be selected generously for the start and also the end of the stripped insulation. A method in which modest requirements are made in respect of the synchronization of the individual wires is illustrated here.

Figure 9B:
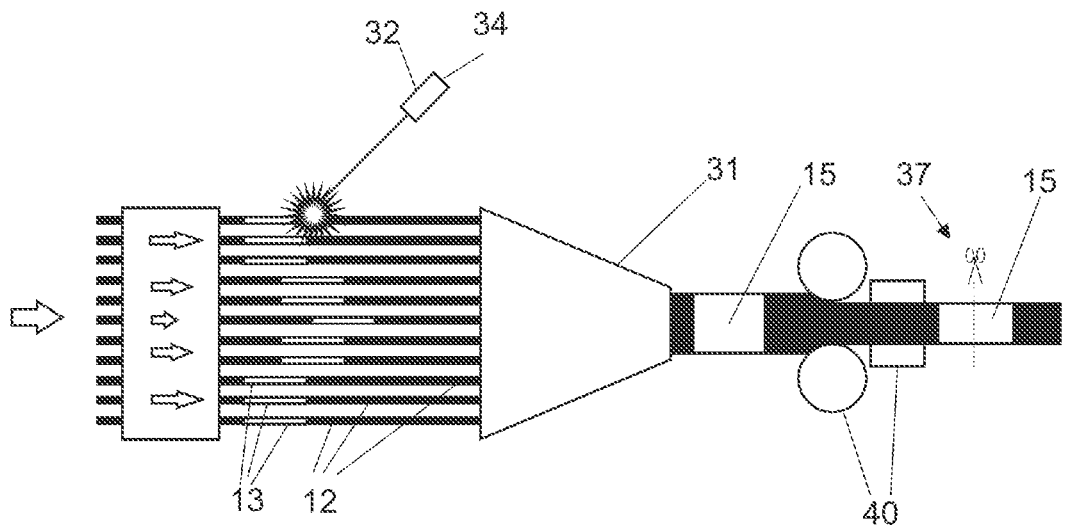
FIG. 9b is a schematic view of a variant of the exemplary embodiment according to FIG. 9a in which insulation-stripped regions of equal length are placed such that they come to lay flush one above the other in the event of twisting.

FIG. 9b shows a variant of the method according to FIG. 9a in which the insulation-stripped sections (partial lengths 13) of equal length have to be placed so precisely that they come to lie flush one above the other in the event of twisting. On account of the required precision/synchronization, a precise and rapid-response insulation-stripping method, such as laser evaporation, is particularly advantageous here. (The arrows indicate the different feed speeds of the individual wires (or partial stranded wire) of each layer in which the individual wires run at a differential speed which is suitable for compensating for the difference in length of the various wires depending on position, so that the start and the end of the insulation sections come to lie flush one above the other.

Figure 10:
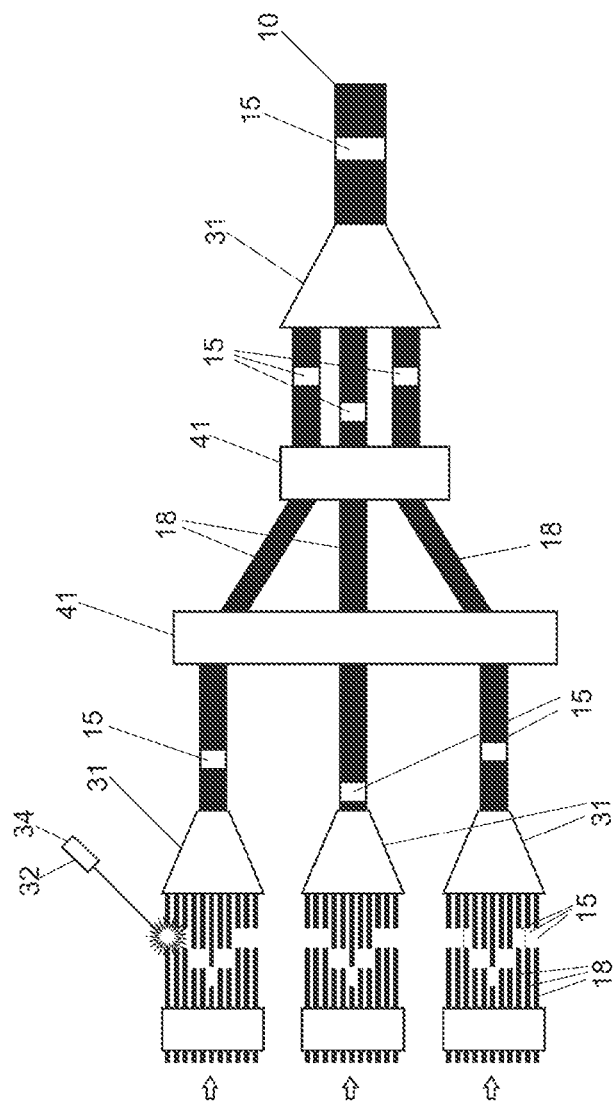
FIG. 10 is a schematic view of a further exemplary embodiment of a production variant for a shaped stranded wire which is composed of partial stranded wires, in which three partial stranded wires are shown in a manner representing the further partial stranded wires of the shaped stranded wire.

FIG. 10 shows a further exemplary embodiment of a production variant of a shaped stranded wire which is composed of partial stranded wires 18. The method according to figure pull transfers the principle of the method according to FIG. 9b from the production of stranded wires from individual wires 12 to the production of stranded wires by partial stranded wires 18. In this case, instead of the individual wires 12, partial stranded wires 18 with corresponding contact-making regions 15 are brought together in order to ultimately form a final stranded wire 10 which has a single contact region 15 or two contact regions 15 at both ends of the stranded wire. A two-stage method for producing a second-grade stranded wire is illustrated by way of example. Reference symbol 41 denotes guide devices which provide for parallel supply of the partial conductors into a bringing-together device 31. It is possible for the method according to FIG. 9a or 9b to be executed as a partial step in the method according to FIG. 10, for example for the method from FIG. 9a or 9b to be executed before the method illustrated here. It is equally possible to execute the method from FIG. 9a or 9b during or after the method illustrated here. This means, for example, that a partial stranded wire 18 in the function of a core wire is wound with further individual wires at the outer circumference. However, the option of entwining an individual conductor 12 in the function as a core wire with a plurality of partial stranded wires at the outer circumference is also covered. Obvious variations of the example shown here are hereby suggested to a person skilled in the art.

Figures 11, 12:
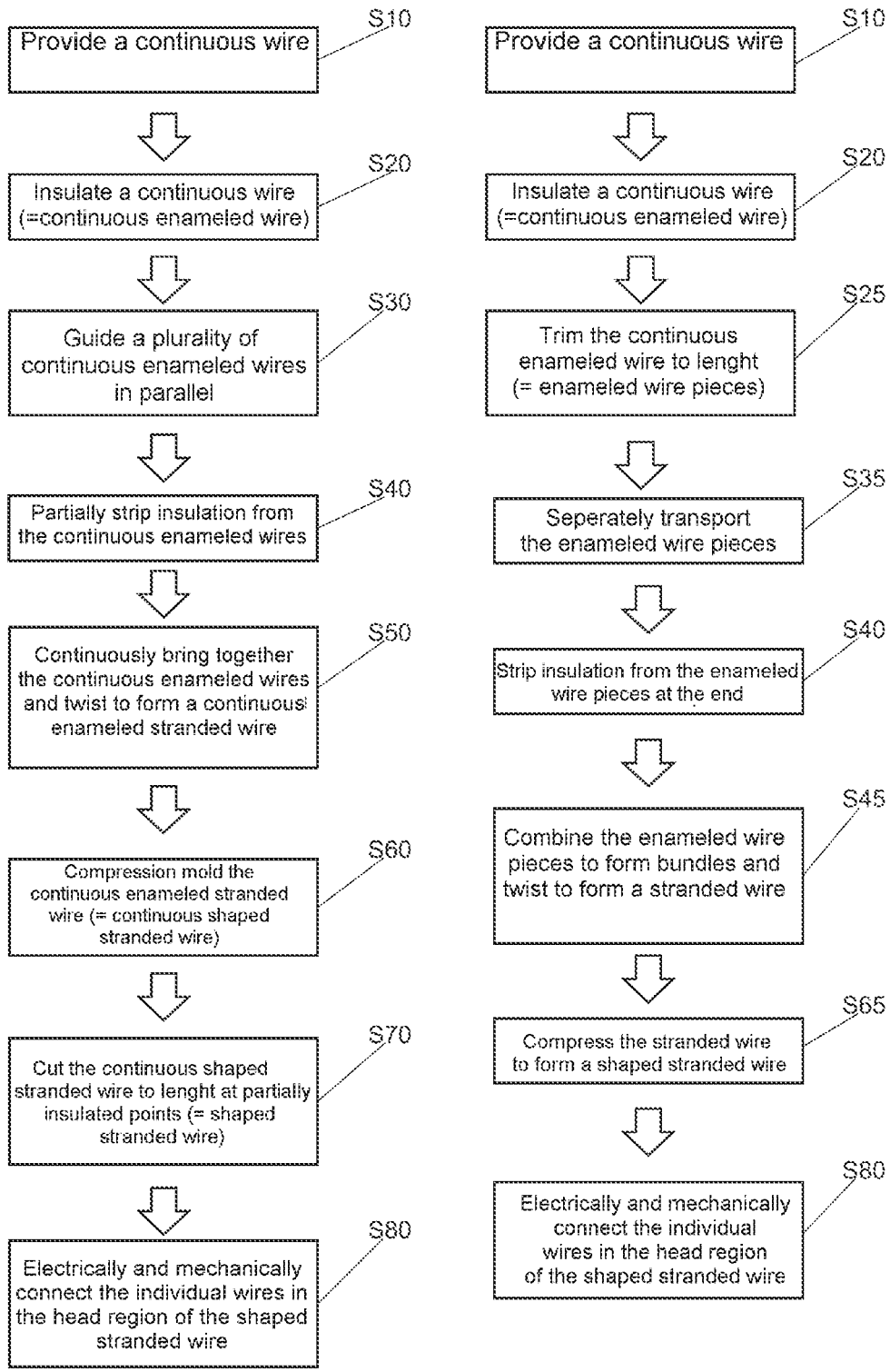
FIG. 11 is a flow chart of a possible order of the production steps of a continuous shaped stranded wire production method for example according to FIGS. 9a and 9b.
FIG. 12 is a flow chart of a possible order of the production steps of a batchwise shaped stranded wire production method for example according to FIGS. 8a and 8b.

FIGS. 11 and 12 illustrate the order of two exemplary production processes. FIG. 11 illustrates a process sequence with continuous production, and FIG. 12 illustrates a process sequence with batchwise production. For both production processes, wires are provided (S10) as continuous wires, for example in coil form, and are insulated (S20), for example, in accordance with the partial method shown in FIG. 7. In accordance with the method from FIG. 11, a plurality of wires are then guided in parallel (S30) analogously to FIG. 9a or 9b, so that the wire sections are in coherent form, but are separated and can be individually stripped of insulation (S40) at the desired points. The individual wires which are prepared in this way are stranded (S50) in one or more twisting or stranding devices to form a stranded wire in such a way that they have clearly delimited contact sections. The continuous enameled stranded wire is then compressed in a method which is suitable for continuous production, for example roll forging, and shaped (S60) into a desired outer contour. The continuous shaped stranded wire which is then produced are severed in the middle of the contact points which are provided by the partial stripping of insulation, in order to produce (S70) shaped stranded wires with contact points on both sides. The individual wires are then electrically and mechanically connected to one another (S80) in the contact region. The shaped stranded wire which is now present could then be inserted into a slot of a stator.

The method according to FIG. 12 differs from the method 11 in respect of steps S25, S35, S45 and S65. In S25, a continuous wire is trimmed, for example, to one or more lengths according to the embodiments in FIG. 6a or 6b, the individual wires or enameled wire pieces are separated (S35) and stripped of insulation (S40) over a partial length at the ends. A certain number of prepared individual wires are bundled and twisted to form a stranded wire in such a way that a clearly defined contact region is produced (S45) at the end. This partial step can be repeated several times and hierarchically structured in order to produce higher-order stranded wires. The stranded wire is then compression molded (S65), for example in a lifting press. In step S80, the individual wires are electrically and mechanically connected in the contact region of the shaped stranded wire. Step S80 can precede or follow step S65. Advantages of the solution according to the invention are in particular:
  a uniform quality level for all of the shaped stranded wires
  increased reliability given the same quality
  improved thermal, electrical and mechanical contact
  shorter cycle times since the required contact forces, times and—if applicable—welding currents for connecting the head region can be lower on account of the lack of insulation
  use of fewer resources, in particular when cutting off the end section with an enamel overhang is dispensed with
  improved further processability for connection to form conductor loops:
Owing to a higher degree of compaction of the head end, in association a smaller head geometry and ultimately increased accessibility during assembly, for example for fitting interconnection webs
  shortening of installation space I: less ingress of heat into critical regions and as a result shortening of shaped stranded wires given the same insulation performance: owing to lower processing loads (current intensity, time, force), less heat is developed, as a result of which the main insulation and also the individual wire insulation of a shaped stranded wire is acted on to a lesser extent in the direction of the active length, that is to say in the direction of the stator slot, and therefore the safety distance between the head end and the active length of the shaped stranded wire can be shortened. (The possible shortening of installation space is considerable and moves in the region of a few mm; the previous ingress of heat led to brittle zones beneath the sleeves of around 6 mm on each side of the shaped stranded wire which no longer ensure reliable insulation)

shortening of installation space II: shortening of installation space when using sleeve lugs or tabs since the enamel residues do not have to be captured in a separate "dead space" which would increase the size of the sleeve length—the enamel residues are conductive on account of their carbon content and therefore may not either enter the active part (stator slot) nor establish contact with other conductor elements or contaminate contact elements.

Selective delimiting of insulated and non-insulated regions of the shaped stranded wire results, amongst other things, in:

shortening of installation space III: when the enamel insulations of all of the individual wires of a shaped stranded wire are cut off in a flush manner, construction can be shorter since the spacing of (stator end)—(insulation end of the individual wire) and also (individual wire insulation end)—(individual wire end=shaped stranded wire end) for all of the individual wires is the same. Therefore, the minimum insulation length (from the end of the active length to the start of the enameled wire which is stripped of insulation) for the creepage resistance or flashover resistance and at the same time the minimum contact-making length (start of enameled wire which is stripped of insulation to enameled wire end=shaped stranded wire end can be selected. This is otherwise not possible in the event of twisting on account of the unequal individual wire lengths.

A preferred exemplary embodiment of the invention is the continuous production according to FIG. 9b and, respectively, FIG. 11.

What is claimed is:

1. a method for producing stranded wires, comprising:
applying an insulation layer to lines to produce insulated lines;
separating the insulated lines using a separating device to keep the insulated lines distanced from each other;
removing the insulation layer from the separated lines along a partial length of the insulated lines using an insulation stripping device; and
bringing the lines together after removing the insulation layer from the partial length of the lines to form a stranded wire using a stranding device such that the partial lengths of the lines are arranged at the same position at least in sections to form a non-insulated contact region.

2. The method of claim 1 wherein the method takes place continuously.

3. The method of claim 1 wherein at least said removing and said bringing steps take place batchwise.

4. The method of claim 1 wherein said removal step comprises laser ablation of the insulation layer.

5. The method of claim 1 wherein the lines are arranged laterally spaced apart from one another during said removing step.

6. The method of claim 1 wherein different-length, non-insulated partial lengths of the lines are formed during said removing step.

7. The method of claim 1 wherein equal-length, non-insulated partial lengths of the lines, said partial lengths arranged in an offset manner, are formed during the removing step.

8. The method of claim 1 wherein different-length, non-insulated partial lengths of the lines are formed based on different transportation speeds of the lines during said removing step.

9. The method of claim 1 wherein said bringing the lines together comprises stranding the lines.

10. The method of claim 1 wherein said bringing the lines together further comprises compression molding to form a shaped stranded wire.

11. The method of claim 1 wherein ends of the non-insulated partial lengths that are disposed at a rear in a transportation direction of the lines are arranged flush when the lines are brought together in accordance with said bringing step.

12. The method of claim 1 wherein ends of the non-insulated partial lengths that are disposed at a front in a transportation direction of the lines are arranged flush when the lines are brought together in accordance with said bringing step.

13. The method of claim 12 wherein the ends of the non-insulated partial lengths that are at the front in the transportation direction of the lines form a start of a new stranded wire.

14. The method of claim 1 wherein the lines comprises a plurality of individual wires and/or partial stranded wires.

15. An apparatus for producing stranded wires, comprising:
an insulating device configured to apply an insulation layer to lines;
a separating device configured to separate the insulated lines to keep the insulated lines distanced from each other; and
an insulation stripping device configured to individually remove the insulation layer from the separated lines along a partial length of the lines; and
a stranding device configured to bring the lines together to form a stranded wire;
wherein the stranding device and the insulation stripping device interact such that the partial lengths of the lines are arranged at the same position at least in sections to form a non-insulated contact region.

* * * * *